(12) United States Patent
Bischoff et al.

(10) Patent No.: US 6,486,985 B1
(45) Date of Patent: Nov. 26, 2002

(54) METHOD FOR TRANSMITTING AN ADDITIONAL DATA SIGNAL AND A USEFUL DATA SIGNAL IN AN OPTICAL NETWORK

(75) Inventors: Mathias Bischoff, München (DE); Jürgen Burgmeier, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/402,416

(22) PCT Filed: Apr. 1, 1998

(86) PCT No.: PCT/DE98/00925

§ 371 (c)(1),
(2), (4) Date: Oct. 4, 1999

(87) PCT Pub. No.: WO98/46038

PCT Pub. Date: Oct. 15, 1998

(30) Foreign Application Priority Data

Apr. 4, 1997 (DE) .......................................... 197 13 952

(51) Int. Cl.[7] .............................................. H04B 10/04
(52) U.S. Cl. ......................... 359/124; 359/162; 359/181
(58) Field of Search .................................. 359/110, 124, 359/133, 162, 181

(56) References Cited

U.S. PATENT DOCUMENTS

| 4,205,343 A | * | 5/1980 | Barrett ........................ 358/147 |
| 4,763,326 A | * | 8/1988 | Krick ........................... 359/132 |
| 4,852,129 A | * | 7/1989 | Schwartz ....................... 375/122 |
| 5,285,470 A | * | 2/1994 | Schreiber ........................ 375/1 |
| 5,430,733 A | | 7/1995 | Takasaki ....................... 359/154 |
| 5,917,858 A | * | 6/1999 | Sinha et al. ................ 375/254 |

FOREIGN PATENT DOCUMENTS

| DE | 35 22 130 A1 | 12/1986 |
| DE | 41 29 543 C1 | 1/1993 |
| EP | 0 348 167 | 12/1989 |
| EP | 0 735 705 A1 | 10/1997 |

* cited by examiner

Primary Examiner—Leslie Pascal
(74) Attorney, Agent, or Firm—Bell, Boyd & Lloyd LLC

(57) ABSTRACT

A method for transmitting an additional data signal and a useful data signal, via optical connections, in an optical network, wherein the additional data signal is transmitted on the same channel as the useful data channel and converted into code sequences which are, in turn, superimposed on the useful data signal with a small amplitude. At the reception end, the additional data signal is recovered by cross-correlation.

13 Claims, 3 Drawing Sheets

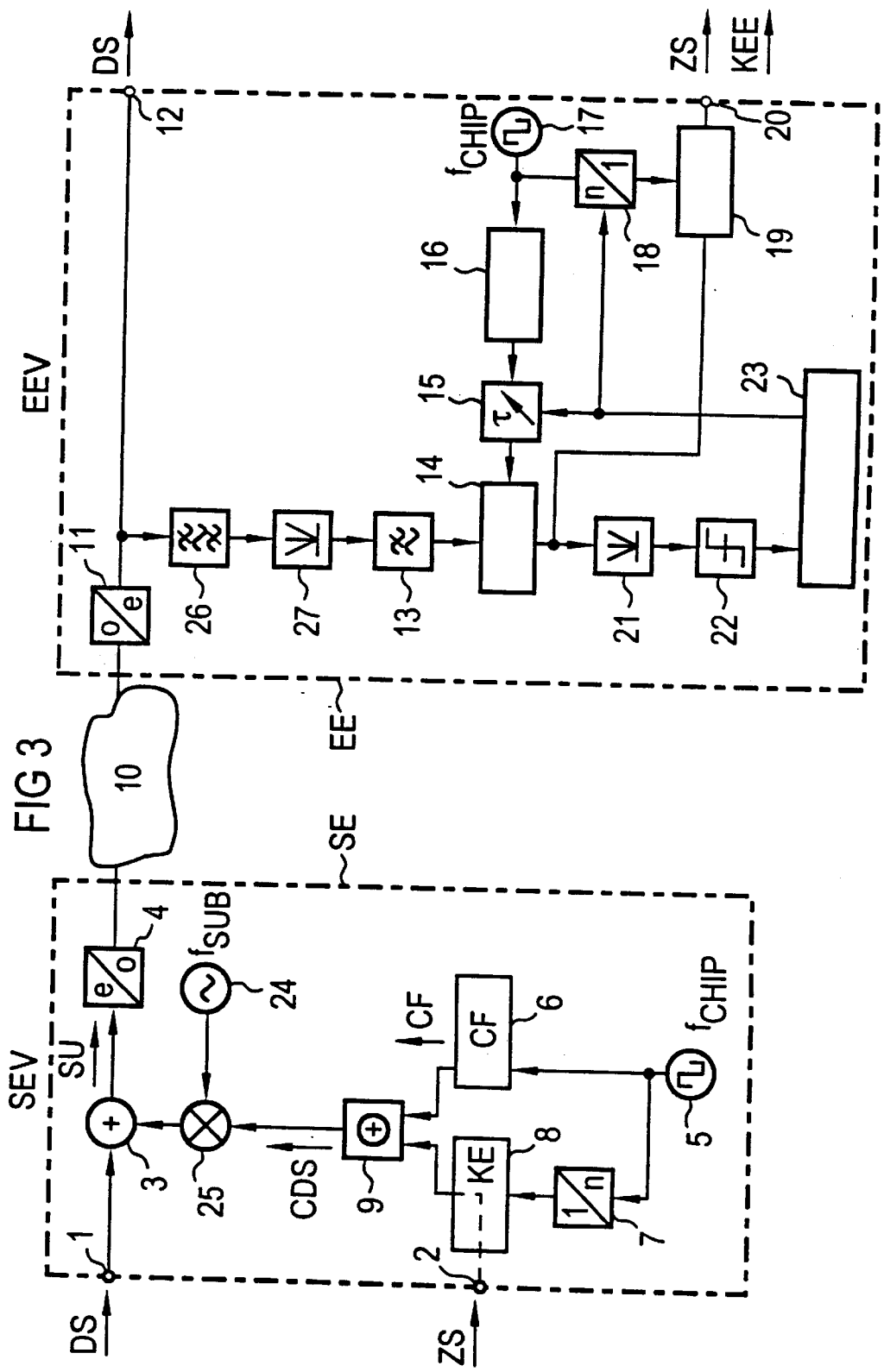

METHOD FOR TRANSMITTING AN ADDITIONAL DATA SIGNAL AND A USEFUL DATA SIGNAL IN AN OPTICAL NETWORK

BACKGROUND OF THE INVENTION

1. Field of the Invention

The present invention relates to a method of transmitting both a useful data signal and an additional data signal on the same channel wherein the additional data signal is first converted into code sequences which are superimposed on the useful data signal with a small amplitude.

2. Description of the Prior Art

In communication networks with non-permanent connections, each connection is provided with an identifier in order to be able to determine whether erroneous connections are occurring as a result of faults in the exchanges. This check is necessary particularly in the case of semi-permanent connections, such as are produced by cross-connectors (network nodes), for example in the synchronous digital hierarchy SDH. These identifiers also need to be transmitted in the case of transparent fully-optical networks in which no access to additional information transported together with the signal as part of the transmission is possible, said information carrying the connection identifier, for example the source identifier, in the existing networks.

German Offenlegungsschrift DE 3 522 130 A discloses a method for transmitting an additional channel in optical transmission systems wherein the additional channel is created without an additional bandwidth of requirement by repeatedly recoding the useful data. However, an appropriate device is then required to recover the useful data.

A further solution is to transmit the identifier on a separate additional channel which is routed parallel to the monitoring connection in all network elements. European patent application EP 0 735 705 A1 discloses a service channel transmitted using a different wavelength. This necessitates an additional frequency requirement. The disadvantage of this method is that it is not possible to prevent the additional channel, transmitting the identifier, and the useful signal from being allocated separately or incorrectly on account of a fault in a network element; for example, of the cross-connector. This means, of course, that reliable detection of an erroneous connection is no longer possible. It is possible, however, for an erroneous connection to be simulated.

The problem, therefore, is that reliable association of the useful data signal and the additional data signal is necessary with optical connections. To do this, the transmission of useful data, described in EP 0 735 705, needs to be modified.

SUMMARY OF THE INVENTION

Accordingly, pursuant to the teachings of the present invention, both the useful data and the additional data are transmitted on the same channel wherein association is always guaranteed. Transmission on the same channel is enabled as a result of the additional data signal first being converted into code sequences which are then superimposed on the useful data signal with a small amplitude.

The use of a code signal converted to a higher frequency band can be advantageous because it means that extremely low-frequency spectral components are avoided. Problems in the lower frequency range of fiber amplifiers are avoided with a carried additional signal.

In all cases, superimposing the additional data signal on the useful data signal only results in the signal-to-noise ratio being slightly worsened; the additional data signal having the effect of slightly increasing the channel noise. Even if the signal-to-noise ratio is generally poor as a result of transmission, the additional data signal still can be detected. If each bit of the additional data signal is allocated a plurality of successive code sequences, the detectability is improved further.

It is advantageous if the additional data signal is a binary signal as this has the largest signal-to-noise ratio wherein the two logic states can be transmitted as inverted code sequences.

It is also prefer that superimposition takes place only during the on-states of the useful data signal, if this signal is transmitted by way of keyed modulation. This is easier to implement [lacuna] in terms of circuitry.

The method can, in principle, be used with all types of modulation; for example, with phase modulation.

The method is particularly suitable for transmitting identifiers or addresses in optical transmission systems. The additional data signal can be checked without accessing the useful data signal, so that it is constantly possible to check the correctness of a connection. A particular identifier, i.e. a particular 1,0 sequence, can be repeatedly transmitted without interruption so as to minimize the detection time. However, transmission using time-division multiplexing with further additional data is also possible. Furthermore, the method also can be used, of course to transmit any desired additional signals.

Additional features and advantages of the present invention are described in, and will be apparent from, the Detailed Description of the Preferred Embodiments and the Drawing.

DESCRIPTION OF THE DRAWING

FIG. 3 shows a variant of the arrangement shown in FIG. 1.

DETAILED DESCRIPTION OF THE PREFERRED EMBODIMENTS

Figure 1:
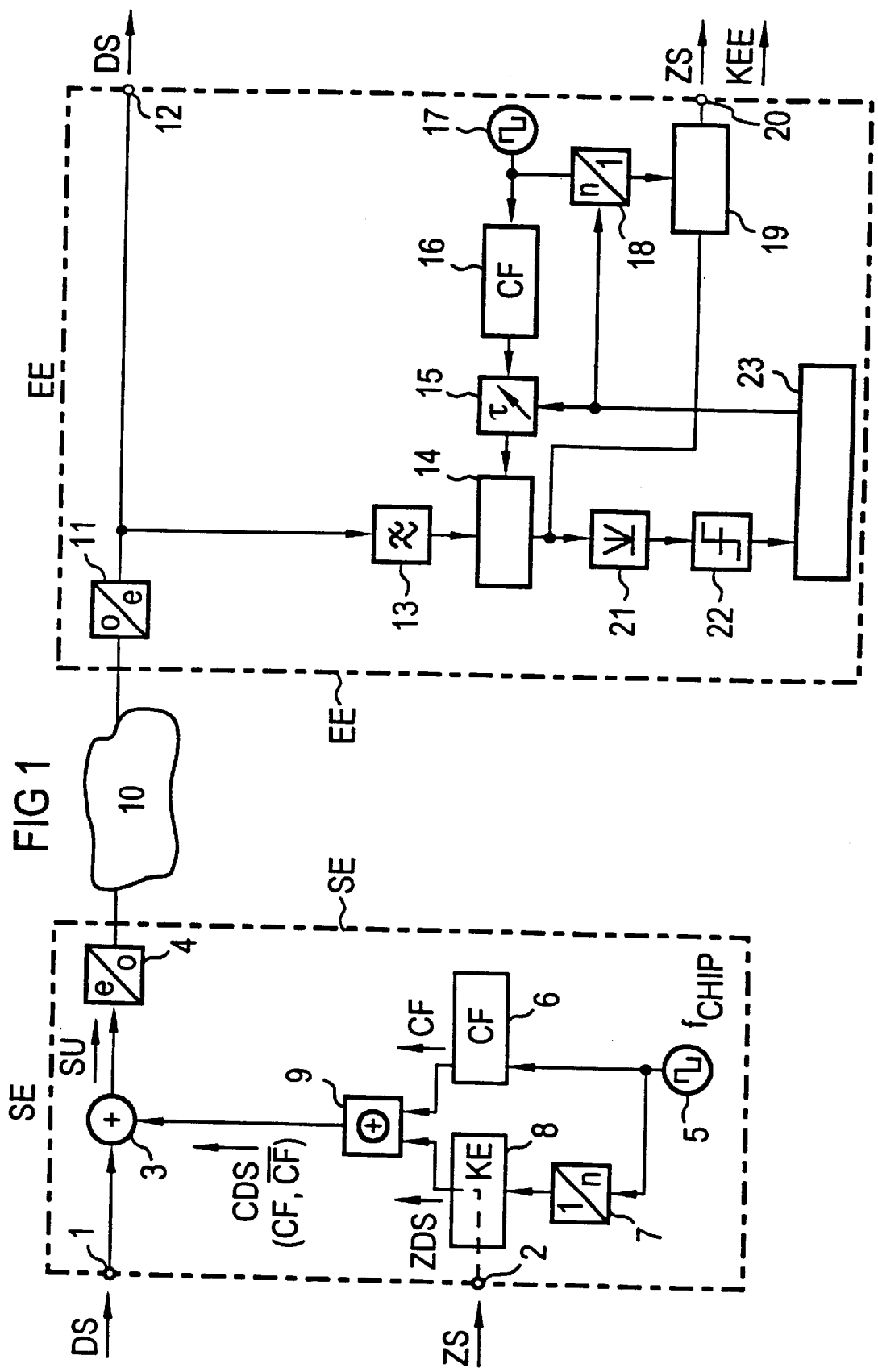
FIG. 1 shows a basic circuit diagram for the transmission of an additional data signal in accordance with the method of the present invention.

The basic circuit diagram of FIG. 1 shows a transmission device SE connected via an optical network 10 to a reception device EE. A data input 1 is used to supply a useful data signal DS, which also may include a plurality of digital data signals, to an adder 3. To a second input of the adder 3, a coded additional data signal CDS is supplied. The two logic states of the binary coded additional data signal CDS are allocated two code sequences CF and $\overline{CF}$, which are superimposed on the useful data signal DS with a substantially smaller amplitude (approx. 0.1 to 0.01 of the amplitude of the useful data signal). The summed signal SU produced in this way is transmitted as an optical network 10 after conversion in an electro-optical converter.

Figure 2A:
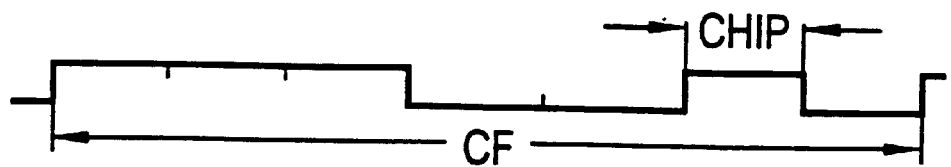
FIG. 2 shows a timing diagram with the code sequences used and the useful data signal.
Figure 2B:
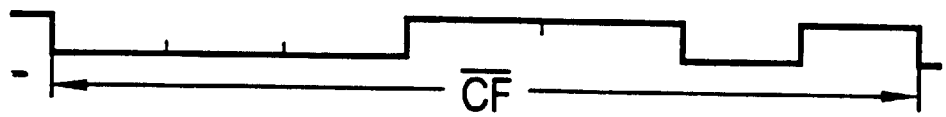
Figure 2C:
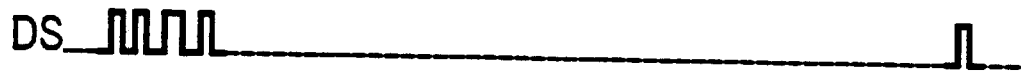

The code sequence CF is produced by a code-sequence generator 6. It is composed of a number of so-called chips CHIP (logic states) which each have a substantially longer period duration than the individual bits of the useful data signal (for example 10 to 100 times). A plurality of these chips form the code sequence CF (FIG. 2, $a$). In the case of binary additional data, logic 1 has this code sequence allocated to it, for example, whereas logic 0 is represented by the inverted code sequence $\overline{CF}$ (FIG. 2, $b$). As a rule, a plurality of successive code sequences are allocated to one bit of the additional data. Like the chip length, this is dependent on the transmission conditions and the relative amplitude of the additional data signal. The code sequence CF is intended to have an autocorrelation function which is as pulsed as possible in order to allow reliable detection in the receiver using cross-correlation.

The chip clock at the frequency $f_{CHIP}$ is produced by a first frequency generator 5 or derived from an existing clock. The bit clock for the additional data signal is derived from the chip frequency by a first frequency divider 7 and is supplied to an identifier generator 8. The identifier produced by the latter corresponds to an address, for example, which determines the code sequences as an additional data signal ZDS via an EXCLUSIVE-NOR gate 9 (unchanged for every logic 1 or inverted for every logic 0).

In addition, it should be noted that an external additional signal ZS also can be transmitted instead of the identifier KE; the signal ZS being supplied to the EXCLUSIVE-NOR gate 9 instead of the identifier. This also can contain information about the type of useful data signals transmitted; e.g., ATM. It is also possible to transmit the two signals, or a plurality of signals, using time-division multiplexing.

Instead of the identifier, it is also possible to transmit any desired additional data ZS which can be fed in via an additional data input 2. This also can be done using time-division multiplexing.

In the receiver EE, the received optical signal is converted into the original (not taking into account faults on the transmission path) summed signal SU again in an opto-electrical converter 11. This signal corresponds to a slightly noisy useful data signal DS and is output as such at the data output 12 for further processing.

A low-pass filter 13 splits off the additional data signal, whose bits include, of course, the code sequences CF and $\overline{CF}$ from the summed signal. A correlator 14 compares the code sequences with the code sequence produced by a second code-sequence generator 16, the latter code sequence corresponding to the code sequence produced at the transmission end and having the same chip frequency, which is produced by a second frequency generator 17. The signals output by the correlator are evaluated, in terms of magnitude, by a rectifier 21 (or a corresponding circuit) and are supplied via a threshold value decision unit 22 to a controller 23. The controller 23 ensures, using a delay element 15 (or a corresponding controller for the code-sequence generator 16), that the code sequences and a second frequency divider 18, which controls an additional-data/identifier detector 19, run synchronously. In the steady state, the threshold value can correspond to the maximum or minimum correlation value.

Instead of the control loop, the correlator can be designed as a shift register whose stored information is compared with the code sequences CF and $\overline{CF}$. The comparison determines whether one of the two code sequences has been received.

The additional-data/identifier detector 19 evaluates the information output by the correlator and either converts it into the additional information ZS or assesses a longer bit sequences in order to output an acknowledgement signal KEE at the output 20 when a particular identifier is received. In addition, it should be noted that the identifier also can be formed using different code sequences. Instead of individual bits, it is also possible to convert bit combinations into various code sequences; for example, four bit pairs 00, 01, 10 and 11 into four code sequences superimposed on the useful data signal.

FIG. 3 shows an arrangement which essentially corresponds to FIG. 1 but in which the code sequences CF, $\overline{CF}$ produced by the additional data signal are additionally converted, in a mixer 25 with the aid of a subcarrier at the frequency $f_{SUB}$, into a desired frequency band offering transmission advantages. The reception device then needs to have an appropriate filter device, the bandpass filter 26, and a detector 27 to demodulate the additional data signal. Using this method, it is possible to transmit different additional data signals in different additional frequency bands.

Although the present invention has been described with reference to specific embodiments, those of skill in the art will recognize that changes may be made thereto without departing from the spirit and scope of the invention as set forth in the hereafter appended claims.

We claim:

1. A method for transmitting an additional data signal and a useful data signal in an optical network, the method comprising the steps of:

converting, at a transmission end, the additional data signal into a coded additional data signal having a smaller amplitude than that of the useful data signal and having defined code sequences, each of the defined code sequences including a plurality of chips and having a lower chip frequency than a bit frequency of the useful data signal;

superimposing the coded additional data signal on the useful data signal to form a summed signal;

transmitting the summed signal;

separating the coded additional data signal from the useful data signal at a reception end;

comparing the coded additional data signal with the defined code sequences;

reconverting the coded additional data signal into the additional data signal; and outputting the additional data signal as an additional signal.

2. A method for transmitting an additional data signal and a useful data signal in an optical network as claimed in claim 1, the method further comprising the steps of:

evaluating the additional data signal; and outputting the additional data signal as an actuation signal.

3. A method for transmitting an additional data signal and a useful data signal in an optical network as claimed in claim 1, further comprising the steps of:

converting, at the transmission end, the coded additional data signal to a higher frequency band;

filtering the coded additional data signal out, at the reception end, of the summed signal; and reconverting the coded additional data signal to the base band frequency by demodulation.

4. A method for transmitting an additional data signal and a useful data signal in an optical network as claimed in claim 1, wherein the additional data signal transmitted is a binary signal having first and second logic states, the first logic state being allocated a first code sequence including a plurality of chips, and the second logic state being allocated a second code sequence which is inverse of the first code sequence.

5. A method for transmitting an additional data signal and a useful data signal in an optical network as claimed in claim 1, wherein one bit of the additional data signal has a plurality of successive code sequences allocated to it.

6. A method for transmitting an additional data signal and a useful data signal in an optical network as claimed in claim 1, wherein the useful data signal is transmitted via on/off keying, and wherein the additional data signal is superimposed on the useful data signal with a smaller amplitude.

7. A method for transmitting an additional data signal and a useful data signal in an optical network as claimed in claim 6, wherein the superimposition occurs only when the useful data signal is keyed on.

8. A method for transmitting an additional data signal and a useful data signal in an optical network as claimed in claim 1, wherein the additional data signal transmitted is an identifier which includes a plurality of bits.

9. A method for transmitting an additional data signal and a useful data signal in an optical network as claimed in claim 8, wherein different code sequences are transmitted for different identifiers.

10. A method for transmitting an additional data signal and a useful data signal in an optical network as claimed in claim 8, wherein the identifier includes information about at least one of a source of the useful data signal, a sink of the useful data signal, and a type of the useful data signal.

11. A method for transmitting an additional data signal and a useful data signal in an optical network as claimed in claim 1, wherein the useful data signal transmitted is an external additional signal.

12. A method for transmitting an additional data signal and a useful data signal in an optical network as claimed in claim 1, wherein the additional data signal transmitted is an identifier which includes a plurality of bits and information about at least one of a source of the useful data signal, a sink of the useful data signal, and a type of the useful data signal, wherein the useful data signal transmitted is an external additional signal, and wherein both the identifier and the external additional signal are transmitted using time-division multiplexing.

13. A method for transmitting an additional data signal and a useful data signal in an optical network as claimed in claim 1, further comprising the step of:

frequency modulating at least one additional data signal; and combining the at least one frequency modulated additional data signal with the useful data signal.

* * * * *